United States Patent Office 2,695,571
Patented Nov. 30, 1954

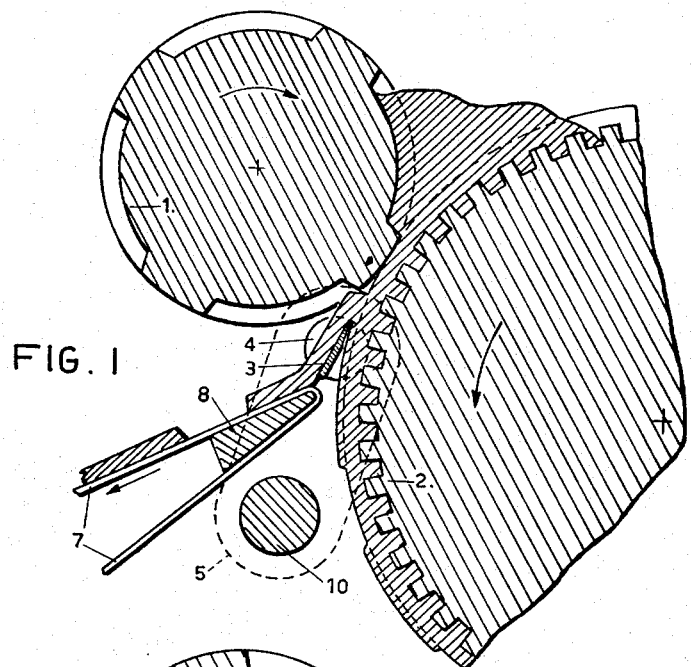
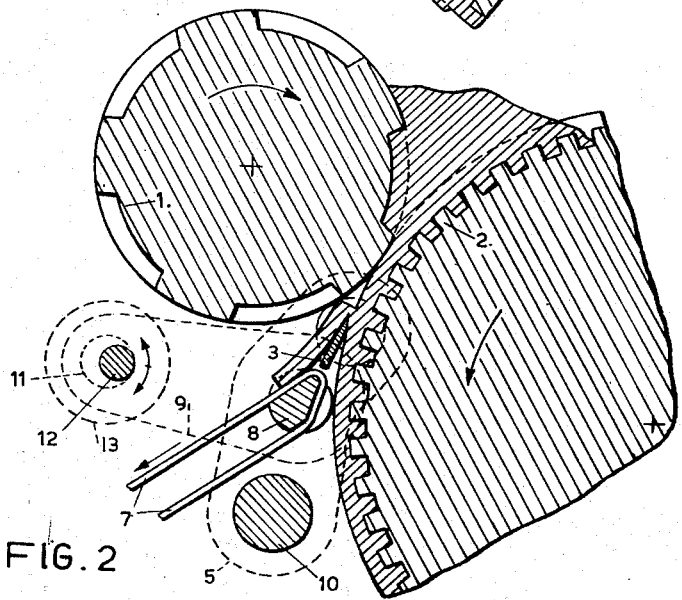

2,695,571
MACHINE FOR MOLDING SHAPES OF DOUGH

Arnoldus C. J. Kalmeijer, The Hague, Netherlands, assignor to N. V. Haagsche Bakkerijmachinefabriek Arnold Kalmeijer, The Hague, Netherlands, a company Application July 5, 1952, Serial No. 297,353

1 Claim. (Cl. 107—8)

This invention relates to improvements in and to dough molding machines.

In a machine for molding shapes of dough various parts cooperate, among which are a feeding roll, a molding roll and a knife for cutting off the shapes of dough formed on the feeding roll.

In machines of this type and in accordance with the invention the separated shapes of dough are taken up by the knife for deposit on a conveyor band, which at its point of reversal of movement is passed along a bar adjacent the knife, which bar is angular in section, so that said conveyor band at said point is bent at an acute angle.

With dough molding machines it was heretofore conventional to arrange a blowing device between the knife and the point of reversal of the movement of the conveyor band to prevent bending the shapes of dough to be placed onto the band, a rotary brush being further provided for pressing the shapes of dough against the band. Such known molding machine is complicated as it needs a compressor for supplying compressed air and, moreover, the rotary brush presents the drawback that it causes damage of the surface of the shapes of dough, which can easily adhere to the brush.

According to the invention a simple and reliably operating machine is obtained in view of the fact that the knife is directed towards the apex of the acute angle at the point of reversal of movement of the conveyor band whereby the lower edge of the knife is located directly adjacent said point of the conveyor band. With said arrangement the width of the knife, e. i. the distance from the sharpened forward edge to the back edge of the knife may be kept as narrow as possible so that the conveyor band will receive at least a portion of the shape of dough which adheres to the band before the shape of dough has been completely separated from the feeding roll, so that the pulling action of the conveyor band overcomes the dough retaining action along the knife, whereby adherence of the shapes of dough on the knife is prevented.

The knife may preferably be adjustable in order to obtain with the same molding roll shapes of dough of different thickness. In order to maintain with this arrangement, the position of the knife with respect to the point of reversal of movement of the conveyor may be made adjustable together with the knife.

The above and other objects of the invention will become further apparent from the following detailed description reference being made to the accompanying drawing, showing preferred embodiments of the invention.

In the drawing:

Fig. 1 is a fragmentary sectional view of one embodiment of the invention showing diagrammatically parts of a dough molding machine.

Fig. 2 is a sectional view of an improved and modified embodiment of the invention, similar to Fig. 1.

In the discharge space or bight between the rotating molding roll 1 and rotating feeding roll 2 there is located an inclined knife 3, which is supported by trunnion means 4 and which is reciprocated substantially parallel to the axis of said feeding roll during cutting operation.

Reciprocating means for the knife and mechanism in connection therewith are omitted in the drawing, but may consist of cam means as described more clearly in my prior U. S. Patent No. 2,878,585, whereby the movement of the knife occurs in a direction parallel to the axis of rotation of the feeding roll. Knife 3 with its trunnion means 4 is supported on levers 5 secured on shaft 10 which may be rocked for adjustment of the knife with respect to the roll 2.

The conveyor band 7 which takes up the severed shape of dough at the turning point of reversal of movement adjacent the knife is passed over a bar 8 more or less triangular in cross section.

As shown in Figs. 1 and 2, the knife 3 with its rear edge is directed toward the apex or nose of the acute angle described by the conveyor band at its point of reversing movement. The knife is relatively narrow measured from the forward sharpened edge to its rear edge, so that the shape of the dough is already taken up by the conveyor band before the dough shape has been severed from the feeding roll.

According to Fig. 2, bar 8 at the turning point of the conveyor band is adjustable simultaneously with the knife 3. To this end triangular bar 8 over which the conveyor band 7 is trained, is supported by rocking levers 5 carrying also knife 3. Adjustment of bar 8 and knife 3 is effected by means of adjusting lever 9, which is mounted on eccentric part 12 of shaft 11, so that when the latter is rotated by wheel 13 bar 8 as well as knife 3 are simultaneously adjusted. This common adjustment of bar 8 and knife 3 presents the advantage, that a still narrower knife may be used, so that also the smallest shapes of dough are already taken up by the conveyor band before being completely severed from the feeding roll.

It can thus be seen that there has been provided in accordance with the invention a machine for molding shapes of dough and like plastic materials comprising a feeding roll, a molding roll, said feeding roll and said molding roll being arranged to provide a bight therebetween, an inclined knife having a rear edge and extending with its forward sharpened edge into said bight for slicing off molded dough shapes when said dough is fed between said feeding roll and said molding roll, a bar triangular in cross section positioned with its apex directed toward the rear edge of said knife, a conveyer band threaded over said triangular bar and forming a nose at the apex of the latter for receiving dough shapes for further transportation by said conveyor band, and means supporting said knife and said bar, whereby a shape of dough adheres to the band prior to being completely sliced off from the dough on said feeding roll.

Various changes and modifications may be made without departing from the spirit and scope of the present invention and it is intended that such obvious changes and modifications be embraced by the annexed claim.

Having thus described the invention, what is claimed as new and desired to be secured by Letters Patent, is:

A machine for molding shapes of dough and like plastic materials comprising a feeding roll, a molding roll, said feeding roll and said molding roll being arranged to provide a bight therebetween, an inclined knife having a rear edge and extending with its forward sharpened edge into said bight for slicing off molded dough shapes when said dough is fed between said feeding roll and said molding roll, a bar triangular in cross section positioned with its apex directed toward the rear edge of said knife, a conveyor band threaded over said triangular bar and forming a nose at the apex of the latter for receiving dough shapes for further transportation by said conveyor band, means supporting said knife and said bar, whereby a shape of dough adheres to the band prior to being completely sliced off from the dough on said feeding roll, said supporting means operatively connecting said bar with said knife, and means operable for simultaneously adjusting said knife and said bar relative to said bight, whereby the incline of discharge direction of sliced off dough shapes onto said conveyor band may be regulated within said bight.

References Cited in the file of this patent
UNITED STATES PATENTS

| Number | Name | Date |
|---|---|---|
| 1,724,827 | Costello, Jr. | Aug. 13, 1929 |
| 1,878,585 | Kalmeijer | Sept. 20, 1932 |
| 1,971,087 | Werner | Aug. 21, 1934 |
| 2,001,243 | Elliott | May 14, 1935 |
| 2,165,528 | Baker et al. | July 11, 1939 |
| 2,167,388 | Kremmling | July 25, 1939 |